३,३४५,३७३
2-POLYMETHYLALLYL-5,9-DIMETHYL-6,7-
BENZMORPHANS AND DERIVATIVES
Maxwell Gordon, Elkins Park, and John J. Lafferty, Levittown, Pa., assignors to Smith Kline & French Laboratories, Philadelphia, Pa., a corporation of Pennsylvania
No Drawing. Filed May 25, 1964, Ser. No. 370,073
5 Claims. (Cl. 260—294)

ABSTRACT OF THE DISCLOSURE 2-polymethylallyl-5-9-dimethyl-6,7-benzmorphan derivatives having analgetic antagonist properties such as analgetic and analgetic reversal activities. The compounds are prepared by reacting at the 2-position the appropriate 2'-functionalized or free hydroxy-5,9-dimethyl-6,7-benzmorphan with the appropriate polymethylallyl halide. O-derivatives at the 2'-position may optionally be prepared after N-polymethylallylation.

This application is a continuation-in-part of our copending application Serial No. 13,982 filed on March 10, 1960.

---

This invention relates to new polymethylated N-allyl 5,9-dimethyl-6,7-benzmorphan derivatives having novel pharmacodynamic activity. More specifically, these compounds have been found to be antagonists of analgetics. The antagonistic effects of these compounds are pronounced against the benzmorphan analgetics such as phenazocine and its analogues. This activity is caused by overdosing. An example of such a side activity is respiratory depression. Furthermore these compounds in common with prior art analgetic antagonists (Winter et al., Arch. int. pharmacodyn. (1957) 110 186) have useful analgetic activity in man in their own right. Also of particular interest is the fact that in man these compounds do not possess the "nalorphine side effects" of other antagonistic agents agents at analgetically effective doses. Such side effects are of the hallucinogenic or psychotomimetic type such as crazy thoughts, nightmares, screaming, disorientation, etc.

The compounds of this invention are represented by the following fundamental formula:

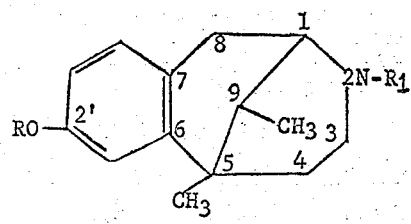

in which R is hydrogen, methyl, acetyl, carbamoyl, benzyl, hydroxyethyl, carbethoxymethyl, dimethylaminoethyl or methoxymethyl; and $R_1$ is a polymethylallyl or from 5 to 6 carbon atoms, such as —$CH_2CH=C(CH_3)_2$,

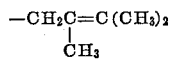

or

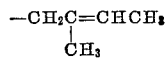

Preferred compounds of this invention are those in which $R_1$ is —$CH_2CH=C(CH_3)_2$.

Also included in this invention are various isomers of the above-noted structures, such as cis-trans isomers ("normal" and "iso" series, respectively) at the 5,9 positions, the 2, 9 positions, or individual optical isomers which might be separated by fractional crystallization of the diastereoisomeric salts formed, for instance, with d- or l-tartaric acid or D-(+)-α-bromocamphor sulfonic acid. The important iso series of compounds is assumed to have the 9-methyl group in the trans or distal position related either to the 5-methyl group or the 2-N-substituent, however, the absolute configuration of these compounds is not readily apparent at this time.

The bases of this invention may be used as such or in the form of their nontoxic, pharmaceutically acceptable acid addition salts. Such salts are prepared from suitable acids, such as inorganic acids, for instances, hydrochloric, hydrobromic, sulfuric, phosphoric, or sulfamic acid; or organic acids, for instance, acetic, maleic, lactic, ethanedisulfonic, glycolic, salicylic and fumaric acids. The acid addition salts are prepared by reacting the base with either one equivalent of acid or preferably an excess in an organic solvent such as ether or an ethanol-ether mixture. Alternatively, an acid salt of the base, say the hydrochloride, can be reacted with a salt such as the ammonium salt of an organic acid in an aqueous mixture to form an insoluble salt by double decomposition.

The compound of this invention are prepared by reacting the corresponding 5,9-dimethyl-6,7-benzmorphan starting material (U.S. Patent No. 2,924,603) having a secondary amine function at position 2 with the appropriate reactive allylic halide, such as the chloride, bromide or iodide, usually in the presence of an acid binding agent such as an alkali metal carbonate, hydroxide, etc. The carbonates are preferred such as sodium bicarbonate, potassium bicarbonate, sodium carbonate and potassium carbonate. The reaction is run in an organic solvent in which the reactants are mutually soluble such as a lower alcohol for instance ethanol, methanol or isopropanol. The reaction is preferably run at the reflux temperature of the mixture at from 1 to 24 hours.

The product is isolated by concentrating the filtered molten solution. The residue is taken into an organic solvent in which the inorganic salts in the mixture are not soluble, such as ether or benzene. The dried organic extracts are then worked up to give the desired base.

The 2'-hydroxyl moiety of the compounds of this invention behaves as a normal phenolic hydroxyl in that it can be esterified or etherified with retention of activity. For instance, the acetate can be formed by using an excess of acetic anhydride under standard reaction conditions. The methyl ether can be formed by reaction with diazomethane, preferably before N-alkylation. As a practical matter, the carbon content of the acyl or alkyl portions of these derivatives shall be a maximum of 7. Other acyl moieties exemplary of those included are the benzoate, propionate, isobutyrate, etc. The acetate is preferred.

The other O-ether derivatives can be prepared from 5,9-dimethyl-2'-hydroxy-6,7-benzmorphan by four steps: N-acylation to prepare the N-acylderivative such as the formyl, carbobenozoxy, carbomethoxy or carbethoxy derivative then alkylation at the N-position.

The following examples are illustrative of the compounds of this invention and the synthetic procedures for preparing these compounds.

Example 1

A mixture of 4.5 g. of 5,9-dimethyl-2'-hydroxy-6,7-benzmorphan in 150 ml. of methyl formate is heated at reflux for four days. The mixture is evaporated and the residue washed with water and then ethyl ether. The residue remaining is crude 5,9-dimethyl-2-formyl-2'-hydroxy-6,7-benzmorphan.

A mixture of 2.5 g. of 5,9-dimethyl-2-formyl-2'-hydroxy-6,7-benzmorphan, 0.5 g. of sodium carbonate, 1.3 g. of benzyl chloride in 150 ml. of toluene is heated at reflux for several hours. The solution is washed with water, then evaporated to leave 2'-benzyloxy-5,9-dimethyl-2-formyl-6,7-benzmorphan. This residue is warmed for an hour in methanolic hydrogen chloride. The mixture is evaporated to give the free base.

A mixture of 3 g. of 2'-benzyloxy-5,9-dimethyl-6,7-benzmorphan, 0.4 g. of sodium bicarbonate, 0.8 g. of 3,3-dimethylallyl bromide in 150 ml. of ethanol is stirred under reflux for several hours. The reaction mixture is worked up by evaporating the solvent and trituration of the residue with hexane to give 2'-benzyloxy-5,9-dimethyl-2-(3',3'-dimethylallyl)-6,7-benzmorphan.

The base (500 mg.) in ethanol is treated with hydrogen chloride gas and ether to obtain the hydrochloride salt.

Example 2

A mixture of 2.25 g. of 5,9-dimethyl-2'-hydroxy-6,7-benzmorphan, 0.75 g. of ethyl chloroformate, 0.7 g. of potassium carbonate and 175 ml. of methanol with a few drops of water is heated at reflux for two days. The reaction mixture is evaporated and the residue washed with ether. The ether insoluble residue is the N-carbethoxy analogue. A mixture of 1.4 g. of this compound, 0.2 g. of sodium hydroxide, 0.63 g. of ethylene bromohydrin and 150 ml. of benzene is heated at reflux for two hours. Working up gives 2-carbethoxy-5,9-dimethyl-2'-($\beta$-hydroxyethoxy)-6,7-benzmorphan. This compound (1.7 g.) is hydrolyzed then reacted with $\beta,\beta$-dimethylallyl bromide and sodium bicarbonate in ethanol as in Example 1 to give 2-$\beta,\beta$-dimethylallyl - 5,9 - dimethyl-2'-($\beta$-hydroxyethoxy)-6,7-benzmorphan.

Example 3

Substituting carbobenzoxyl chloride for methyl formate and ethyl bromoacetate for benzyl chloride in Example 1 gives 2 - carbobenzoxy-2'-carbethoxymethoxy-5,9-dimethyl-6,7-benzmorphan. Hydrolysis in methanolic hydrogen chloride gives the base which (1.2 g.) is then reacted with a slight excess of 2,3,3-trimethylallyl bromide with sodium bicarbonate in ethanol to give 2'-carbethoxymethoxy-5,9-dimethyl-2-(2',3',3'-trimethylallyl) - 6,7 - benzmorphan. This compound (200 mg.) is dissolved in ethanolic hydrogen bromide and triturated with ether to give the hydrobromide salt.

Example 4

(A) A mixture of 0.9 g. of 5,9-dimethyl-2'-hydroxy-6,7-benzmorphan, 0.7 g. of $\beta,\beta$-dimethylallyl bromide and 0.6 g. of sodium bicarbonate in 75 ml. of methanol is reacted and worked up as in Example 1 to give 2-$\beta,\beta$-dimethylallyl-5,9-dimethyl-2'-hydroxy - 6,7 - benzmorphan. Treatment with dry hydrogen chloride as described gives the hydrochloride salt.

(B) Substituting the 2'-methyl ether in this reaction gives 5,9-dimethyl-2'-methoxy-2 - $\beta,\beta$ - dimethylallyl-6,7-benzmorphan.

A mixture of 0.6 g. of 2-dimethylallyl-5,9-dimethyl-2'-hydroxy-6,7-benzmorphan in benzene is reacted with an ethereal solution containing 0.3 g. of carbamyl chloride. Evaporation of the solvent gives the 2'-urethane derivative.

Example 5

Substituting a molar equivalent amount of 2-dimethylaminoethyl bromide for the ethylene bromohydrin of Example 2 gives 2-dimethylallyl-5,9-dimethyl-2-dimethylaminoethoxy-6,7-benzmorphan.

Example 6

A mixture of 1 g. of iso-5,9-dimethyl-2'-hydroxy-benzmorphan, 0.9 g. of $\beta,\beta$-dimethylallyl bromide, 0.8 g. of sodium carbonate and 200 ml. of ethanol is stirred under reflux for 19 hours. The cooled mixture is worked up as in Example 1 to give iso-2-dimethylallyl-5,9-dimethyl-2'-hydroxy-6,7-benzmorphan.

What is claimed is:
1. A chemical compound of the class consisting of a free base and its nontoxic, acid addition salts, the free base having the formula:

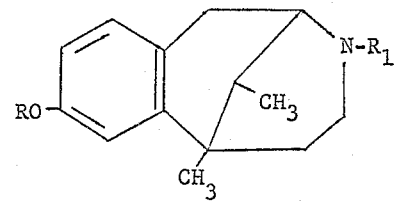

in which R is a member selected from the group consisting of hydrogen, methyl, acetyl, carbamoyl, benzyl, hydroxyethyl, carbethoxymethyl, dimethylaminoethyl and methoxymethyl; and $R_1$ is a polymethylallyl group having 5 to 6 carbon atoms selected from the group consisting of —CH$_2$CH=C(CH$_3$)$_2$, —CH$_2$C=C(CH$_3$)$_2$ and $$-CH_2C=CH-CH_3$$
$$\phantom{-CH_2}|$$
$$\phantom{-CH_2C=CH-}CH_3$$

2. A chemical compound of the formula:

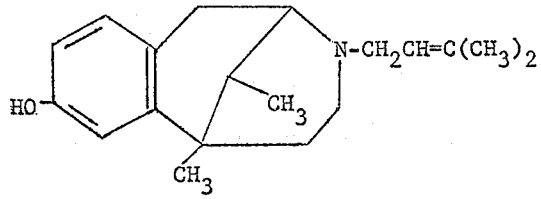

3. A nontoxic acid addition salt of 2-$\beta,\beta$-dimethyl-allyl-5,9-dimethyl-2'-hydroxy-6,7-benzmorphan.

4. 2 - $\beta,\beta$ - Dimethylallyl - 5,9 - dimethyl - 2' - hydroxy-6,7-benzmorphan hydrochloride.

5. Iso - 2 - $\beta,\beta$ - dimethylallyl - 5,9 - dimethyl - 2' - hydroxy-6,7-benzmorphan.

No references cited.

JOHN D. RANDOLPH, Primary Examiner.

WALTER A. MODANCE, Examiner.

A. D. SPEVACK, Assistant Examiner.

UNITED STATES PATENT OFFICE
CERTIFICATE OF CORRECTION

Patent No. 3,345,373　　　　　　　　　　　　　October 3, 1967

Maxwell Gordon et al.

It is hereby certified that error appears in the above numbered patent requiring correction and that the said Letters Patent should read as corrected below.

Column 1, line 41, strike out "agents", second occurrence; line 59, for "or" read -- of --; column 2, line 59, for "carbobenozoxy" read -- carbobenzoxy --; column 4, lines 35 to 37, the formulas should appear as shown below instead of as in the patent:

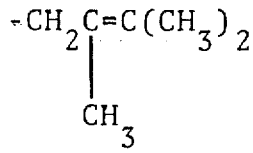　　　　　and　　　　　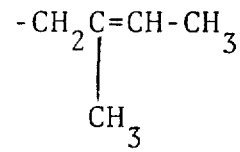

same column 4, line 56, strike out "No references cited." and insert instead the following references:

References Cited by the Examiner

UNITED STATES PATENTS 2,924,603　　2/1960　　Gordon et al------260-293.4
3,138,603　　6/1964　　May---------------260-294.3

Signed and sealed this 24th day of June 1969.

(SEAL)
Attest:

EDWARD M. FLETCHER, JR.　　　　　　　　　WILLIAM E. SCHUYLER, JR.
Attesting Officer　　　　　　　　　　　　　Commissioner of Patents